(12) United States Patent
Liu et al.

(10) Patent No.: US 8,996,669 B2
(45) Date of Patent: Mar. 31, 2015

(54) INTERNET IMPROVEMENT PLATFORM WITH LEARNING MODULE

(75) Inventors: Hongche Liu, Fremont, CA (US); Tom C. Tovar, San Francisco, CA (US); Gopala Tumuluri, San Jose, CA (US); Robert Wilbourn, Palo Alto, CA (US)

(73) Assignee: Nominum, Inc., Redwood City, CA (US)

( * ) Notice: Subject to any disclaimer, the term of this patent is extended or adjusted under 35 U.S.C. 154(b) by 382 days.

(21) Appl. No.: 12/753,827

(22) Filed: Apr. 2, 2010

(65) Prior Publication Data

US 2011/0246634 A1  Oct. 6, 2011

(51) Int. Cl.
- *G06F 15/173* (2006.01)
- *G06F 17/30* (2006.01)
- *H04L 29/06* (2006.01)
- *H04L 29/12* (2006.01)

(52) U.S. Cl.
CPC ........ *H04L 63/102* (2013.01); *G06F 17/30861* (2013.01); *G06F 2221/2101* (2013.01); *H04L 29/12066* (2013.01); *H04L 61/1511* (2013.01)
USPC ........... 709/223; 709/206; 709/217; 709/224; 726/2; 726/4; 726/22; 726/23

(58) Field of Classification Search
CPC ................................ H04L 41/00; H04L 43/00
USPC ....................................................... 705/14.48
See application file for complete search history.

(56) References Cited

U.S. PATENT DOCUMENTS

| | | | |
|---|---|---|---|
| 6,961,783 B1 | 11/2005 | Cook et al. | |
| 7,046,659 B1 | 5/2006 | Woundy | |
| 7,600,042 B2 | 10/2009 | Lemson et al. | |
| 8,095,685 B2 | 1/2012 | Mattila | |
| 8,549,118 B2 | 10/2013 | Ringen | |
| 8,554,933 B2 | 10/2013 | Delos Reyes et al. | |
| 8,707,429 B2 | 4/2014 | Wilbourn et al. | |
| 8,769,060 B2 | 7/2014 | Avirneni et al. | |
| 8,874,662 B2 * | 10/2014 | Graham et al. | 709/206 |
| 2002/0143705 A1 * | 10/2002 | Kaars | 705/51 |
| 2005/0060535 A1 * | 3/2005 | Bartas | 713/154 |
| 2005/0111384 A1 | 5/2005 | Ishihara et al. | |
| 2006/0168065 A1 * | 7/2006 | Martin | 709/206 |
| 2009/0144419 A1 | 6/2009 | Riordan et al. | |
| 2009/0296567 A1 | 12/2009 | Yasrebi et al. | |
| 2010/0030914 A1 | 2/2010 | Sparks et al. | |
| 2010/0106854 A1 * | 4/2010 | Kim et al. | 709/238 |
| 2010/0121981 A1 * | 5/2010 | Drako | 709/245 |
| 2010/0131646 A1 | 5/2010 | Drako | |
| 2010/0211628 A1 | 8/2010 | Shah | |

(Continued)

OTHER PUBLICATIONS

"Secret Key Transaction Authentication for DNS (TSIG)"—Vixie et al, Network Working Group, May 2000 http://tools.ietf.org/pdf/rfc2845.pdf.*

(Continued)

*Primary Examiner* — Randy Scott (74) *Attorney, Agent, or Firm* — Carr & Ferrell LLP (57) ABSTRACT

Redirecting DNS traffic includes receiving, at an Internet improvement platform, a DNS query issued from an Internet application running on a computing device. The Internet navigation platform determines an appropriate response to the DNS query. The response is then executed. Characteristics relative to the query and to the result of a served page may be recorded and later referenced by the Internet improvement platform.

175 Claims, 5 Drawing Sheets

(56) References Cited

U.S. PATENT DOCUMENTS

2010/0303009 A1 12/2010 Liu
2012/0036241 A1 2/2012 Jennings et al.
2012/0178416 A1 7/2012 Miklos et al.
2012/0198034 A1 8/2012 Avirneni et al.
2012/0254996 A1 10/2012 Wilbourn et al.

OTHER PUBLICATIONS

Park, Jeong-Hyun, "Wireless Internet access for mobile subscribers based on the GPRS/UMST network," Communications Magazine, IEEE, vol. 40, No. 4, pp. 38-49, Apr. 2002.

* cited by examiner

INTERNET IMPROVEMENT PLATFORM WITH LEARNING MODULE

BACKGROUND OF THE INVENTION

1. Field of the Invention

The present invention relates generally to improving Internet service traffic, and more particularly to discriminating among DNS (Domain Name System) requests and service requests upon redirecting DNS requests from various sources based on interaction history, adaptive learning, user experiences and global DNS data.

2. Description of Related Art

Since the Internet was launched in 1995, online services have emerged for many consumer and business needs and applications. The power of the Internet has been attributed to its unique properties as a global, two-way medium that allows any user the ability to reach global users or businesses and interact with them, literally at the speed of light. The term "globalization" has become the new order of the economic day, powerfully enabled by the Internet, which has caused massive shifts and transformations in how consumers and businesses conduct their day-to-day personal and commercial business.

In today's "information age" people frequently perform various types of activities using computing devices connected to the Internet. The Internet has made searching for information simple, speedy and efficient. To perform a computerized search, a searcher simply enters a word or words (termed "keywords") into a website query box in order to find information related to the entered words.

Using the Internet to explore available services, reach destinations, share and publish content with friends, and connecting and communicating personally and professionally has become so ubiquitous that Internet use is really no longer only about searching. Individuals today actually want to connect directly with services that are suited to their needs. Users may click on one or more links from a list that appears after a search using keywords or in an article that they are reading without going to a search engine. Users may also type website names, or single word terms, into a browser directly to reach an intended destination, or they might simply click on links presented on some other pages for this purpose. Some of these links, search results and other mechanisms may lead individual users to useful and intended content. Some may lead the user to unintended and harmful content.

When entering the addresses directly into the browser, users may misspell names or terms, or they may enter names of non-existent domains. Users may also inadvertently enter queries for addresses that may be harmful to the user or the user's system, account or identity.

There is a need for an Internet improvement platform that intermediates these requests and allows, at a network level, to redirect queries for erroneous or malicious sites to other sites that may be more appropriate.

SUMMARY OF THE INVENTION

Various embodiments of the present invention disclose systems and methods for an Internet platform that improves the user's Internet experience. More specifically, embodiments relating to directing and filtering Domain Name System (DNS) server traffic are disclosed.

The various embodiments of the systems and methods of directing DNS traffic include receiving at an Internet improvement platform a DNS query issued from an Internet application running on a computing device. The Internet improvement platform then formulates an appropriate response. The response may include redirection of the query, a refusal to serve the request, or simply no response.

Separate modules within the Internet improvement platform may formulate a response for requests directed respectively to non-existent domains, malicious domains, and for requests from designated sources.

The system executes the response and records data relative both to the query received and the response after the request is served.

A learning module included in the Internet improvement platform provides the system with the capacity to learn from the various events as well as the data collected or observed. By monitoring the characteristics of the received queries, and by further monitoring responses to served requests, the system may improve its rule set over time. That is, the system is able to learn from and utilize global Internet events and occurrences to improve its ability to determine the most appropriate response.

A mechanism may be included with served requests, so that the system can detect whether or not the source of the query downloaded the proffered page. The presence or absence of various download factors is recorded and used by the learning module to influence future decisions as to an appropriate response to a query. It can be any mechanism suited to indicating use of an indicated page.

The learning module works in conjunction with the intelligent DNS platform and other modules included in the Internet improvement platform to improve a user's Internet experience.

DETAILED DESCRIPTION

Various embodiments of the present invention relate to systems and methods for directing Internet navigation, including redirecting and/or filtering DNS server traffic. As mentioned above, users sometimes mistype or misspell the names of websites or enter terms directly into the browser, or click on links that point to such misspelled names. Sometimes users enter or click on links pointing to names of websites that do not exist. This can be done unintentionally or intentionally. Additionally, bots, spiders, or other malware might be implemented with malicious intent. Embodiments according to the present invention address these and other problems.

Figure 1:
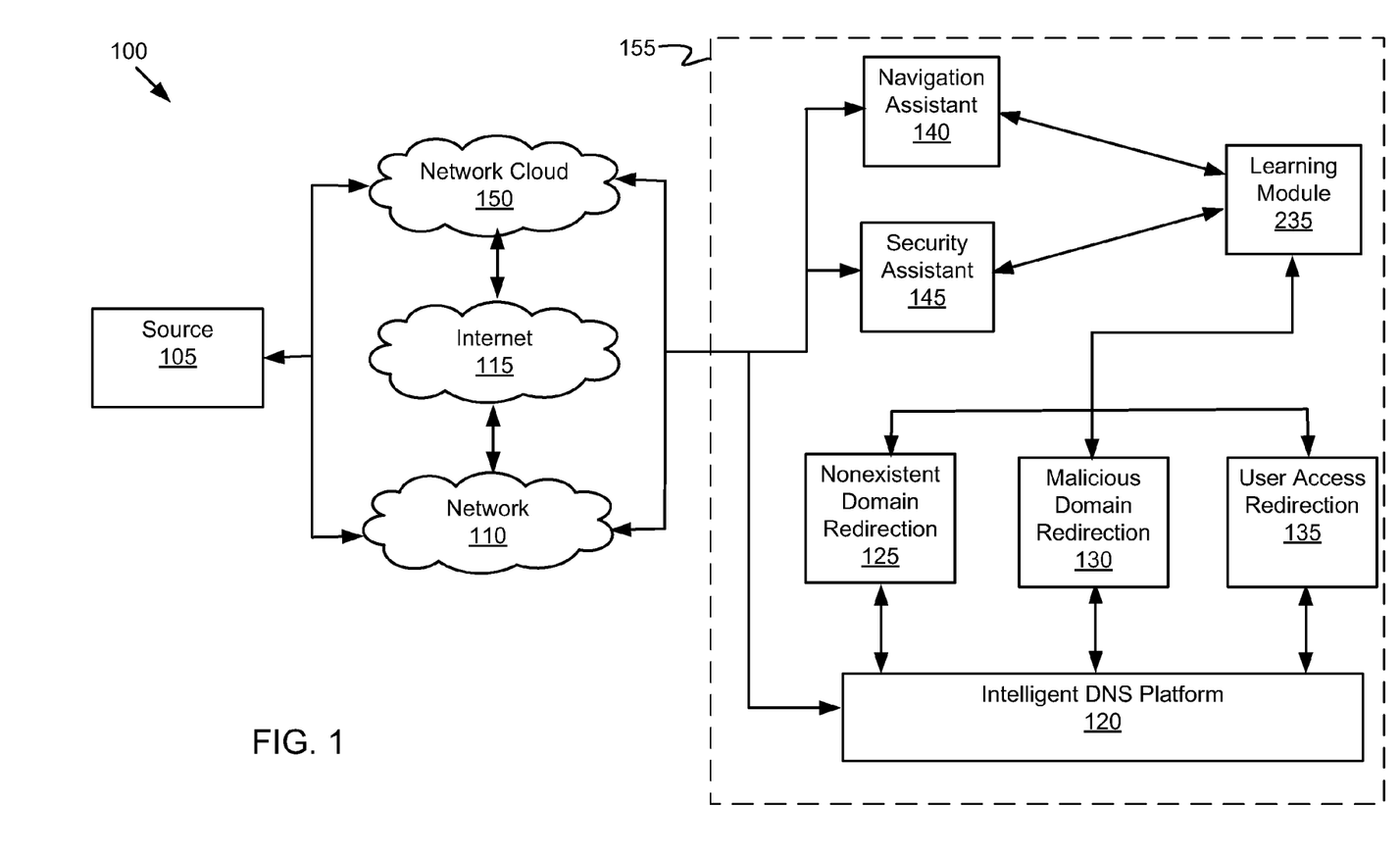
FIG. 1 is a schematic of an exemplary system for directing DNS server traffic.

FIG. 1 is a schematic of an exemplary system 100 for Internet improvement. A source 105 is communicatively coupled with a network 110, the Internet 115, or a network cloud 150. The source 105 may be a legitimate user using a network browser application, a bot, a spider, various forms of malware, automated programs, faulty applications, or mis-programmed or mis-configured network devices etc. The network 110 may be, for example, an enterprise, public or private network. The Internet 115 may be, for example, an Internet service provider (ISP), wireless broadband provider, carrier or cable provider or other communications network. The Network Cloud 150 may be, for example, a direct network connection with the Internet improvement system. For purposes of this patent, the definition of Internet service provider will include any technology that provides a connection with the Internet. Examples of such technologies include, but are not limited to, traditional Internet service providers, telecommunications companies, and any other provider of access to Internet services.

The network 110, the Internet 115, and the network cloud 150 are independently or collectively communicatively coupled with an intelligent DNS platform 120. The Intelligent DNS platform 120 is a DNS server that allows reporting and logging of various DNS events and interactions with one or more service policy modules which may include, for example, software or systems for Non-Existent Domain Redirection 125, Malicious Domain Redirection 130 and/or User Access Redirection 135. The Intelligent DNS platform 120 may be communicatively coupled with the service policy modules. The Intelligent DNS platform 120 operates in conjunction with a learning module 235 described in further detail following.

The Nonexistent Domain Redirection module 125 may enable a Web error redirection service that helps users reach their intended destinations using standard search results or other navigation techniques as the destination verification mechanism. The Nonexistent Domain Redirection module 125 may be controlled by the provider of the network 110.

The Nonexistent Domain Redirection module 125 facilitates domain redirection (via the network 110, the Internet 115 or the network cloud 150). When a user enters or clicks on a link with website information in a web browser application, the user might mistype or misspell a website or domain name, or the link may point to a misspelled domain name. Per the DNS protocol, a query for a nonexistent domain returns an NXDOMAIN error response (e.g. "Server not found"). Upon a DNS query resulting in an NXDOMAIN, the Nonexistent Domain Redirection module 125 redirects qualified non-existent names that may include user typed or clicked names, to a carrier-branded portal with industry standard search results. Search results on this page enhance the user's Web experience by showing, for example, links to various destinations within the relevant query parameters entered by the user. Relevant and thoughtfully presented search results on this page not only enhance the user's experience, but may facilitate the carrier monetizing clicks that generate revenue. The Intelligent DNS Platform 120 and the Nonexistent Domain Redirection module 125 incorporates data about user interaction with these search results from the learning module 235 in order to intelligently examine DNS requests.

In one embodiment, the Nonexistent Domain Redirection module 125 is a carrier-configurable and customizable domain name filter that determines which NXDOMAIN traffic is redirected. The Malicious Domain Redirection module 130 may be controlled by the Internet Service Provider. The Malicious Domain Redirection module 130 facilitates malicious or otherwise harmful domain redirection. The Malicious Domain Redirection module 130 protects Internet users from Web-based malware, harmful sites, and threats such as bots, worms, viruses, and phishing sites. The Intelligent DNS Platform 120 and the Malicious Domain Redirection module 130 incorporate data about malicious websites from the learning module 235 in order to intelligently examine DNS requests.

Upon the identification of a user request to access a malicious site, the Malicious Domain Redirection module 130 may redirect the user to a teaching page that gives information about the threat(s). The teaching page may also provide other information, such as, for example, additional services that might be available. The Malicious Domain Redirection module 130 may provide protection against a variety of Internet threats, including but not limited to phishing, etc.

The Malicious Domain Redirection module 130 may also be used to block access to certain content. For example, the Malicious Domain Redirection module 130 may be used to block sites related to child exploitation, etc. It is contemplated that the Malicious Domain Redirection module 130 may be used to block access of any content or type of content to any audience or type of audience desired. For example, the Malicious Domain Redirection module 130 might restrict access of some content for certain demographics such as children.

The User Access Redirection module 135 may be controlled by the provider of the network 110. The User Access Redirection module 135 facilitates user quarantine applications. The User Access Redirection module 135 redirects a user or other entity for which a determination has been made that the user or entity should not be serviced, has an infected device or should be redirected to a specified Internet service. For example, the User Access Redirection module 135 may redirect a user to a landing page that invites the user to enter his credit card information to renew his subscription to the service provided by, for example, the provider of an Internet improvement platform 155.

A navigation assistant module 140 and a security assistant module 145 are communicatively coupled with the Intelligent DNS platform and the service policy modules which are hosted or resident in a network 110, the Internet 115, and a network cloud 150.

The navigation assistant module 140 is configured to provide a user with navigation assistance using industry standard search results to verify the users intended destination. A user may be provided with a first Internet service, such as a first landing page, after the user mistypes or misspells a domain name within an address window of a network browser application. Alternative pages or sites may be suggested based on aggregate search results. The user can also be redirected to the intended page or a possible page of interest (or a second Internet service).

The security assistant module 145 is configured to provide protection from malware, bot sites, phishing sites, and the undesirable occurrences that might be caused thereby. The security assistant module 145 does more than simply aggregate diverse sets of "black lists." The security assistant module 145 may adapt to real-time traffic patterns that may indicate potential threats, thus protecting vital network resources.

The Internet improvement platform 155 may comprise the navigation assistant module 140, the security assistant module 145, the intelligent DNS platform 120, the nonexistent domain redirection module 125, the malicious domain redirection module 130, and the user access redirection module 135. In all embodiments, the Internet improvement platform 155 may include the learning module 235.

In various embodiments, a source (such as a user) enters a mistyped, misspelled, or otherwise non-existent domain name into a browser. The nonexistent domain redirection module 125 receives the DNS request representing the domain name and, rather than returning a message that the page does not exist, returns a DNS navigation assistant module 140 internet protocol (IP) address (IP address of a navigation assistant module 140 server) to the browser of the user. The user may then be redirected by the navigation assistant module 140 to a search page. The search page may include advertisements, etc. The search page may also include links to advertisements, businesses, or any other suitable link(s) or items. In one exemplary embodiment, a load balancer 220 is communicatively coupled between the user and the navigation assistant module 140. The load balancer 220 may only allow a certain protocol (e.g. http) through to the navigation assistant module 140, for instance.

At other times, the source may be a user, bot, etc. that sends a request for access to a malicious domain. For example, the source may attempt to access a phishing site or some other undesirable or illegal website. The malicious domain redirection module 130 may block access to the site and/or redirect a user to an Internet service or page, such as a warning page.

The source 105 may be, for example, a user that system administrators have deemed should not be serviced for any of a variety of reasons. The user access redirection module 135 may, for example, block access and/or redirect the user to an Internet service or page, such as a page informing the user that he has been denied access to the site he was trying to access until his account is brought current.

It is noteworthy that oftentimes what arrives at the intelligent DNS platform 120 includes queries from bots, spiders, or other malware as mentioned above. The requesting party may or may not have malicious intent. In some instances the user's computer is infected with malware without knowledge on the part of the user. These and other problems are dealt with by the Internet improvement platform 155.

A large percentage of the traffic through the Intelligent DNS platform 120 might normally be generated by non-users (e.g. malware, bots, spiders, etc.). This type of traffic typically will not generate qualified redirects. A redirection module, such as the nonexistent domain redirection module 125, is configured to work in conjunction with the navigation assistant module 140 to filter out most non-user NXRs (NXDOMAIN redirections) that will not generate a browser view. It is desirable to filter out non-user NXRs because non-user NXRs typically do not provide use experience to users.

An output of the nonexistent domain redirection module 125 may be an NXR sent to the navigation assistant module 140. The nonexistent domain redirection module 125 may continue to send NXRs until a lack of real user response is detected. In one embodiment, a user response may be represented by an embedded follow-up signal. The follow-up signal may be downloaded by a user using a browser, which is an indication of a valid user. The follow-up signal not being downloaded may be an indication of a non-user such as a bot etc.

Various forms of follow-up signals are contemplated herein. For example the system could imbed a graphic image in the response to the user. The system may also implement a java script that sends out a follow-up signal (e.g. that a keystroke was identified) to the present system. In another embodiment, a CAPTCHA (Completely Automated Public Turing test to tell Computers and Humans Apart) could be implemented where a user is required to login in order to access a page.

Figure 2:
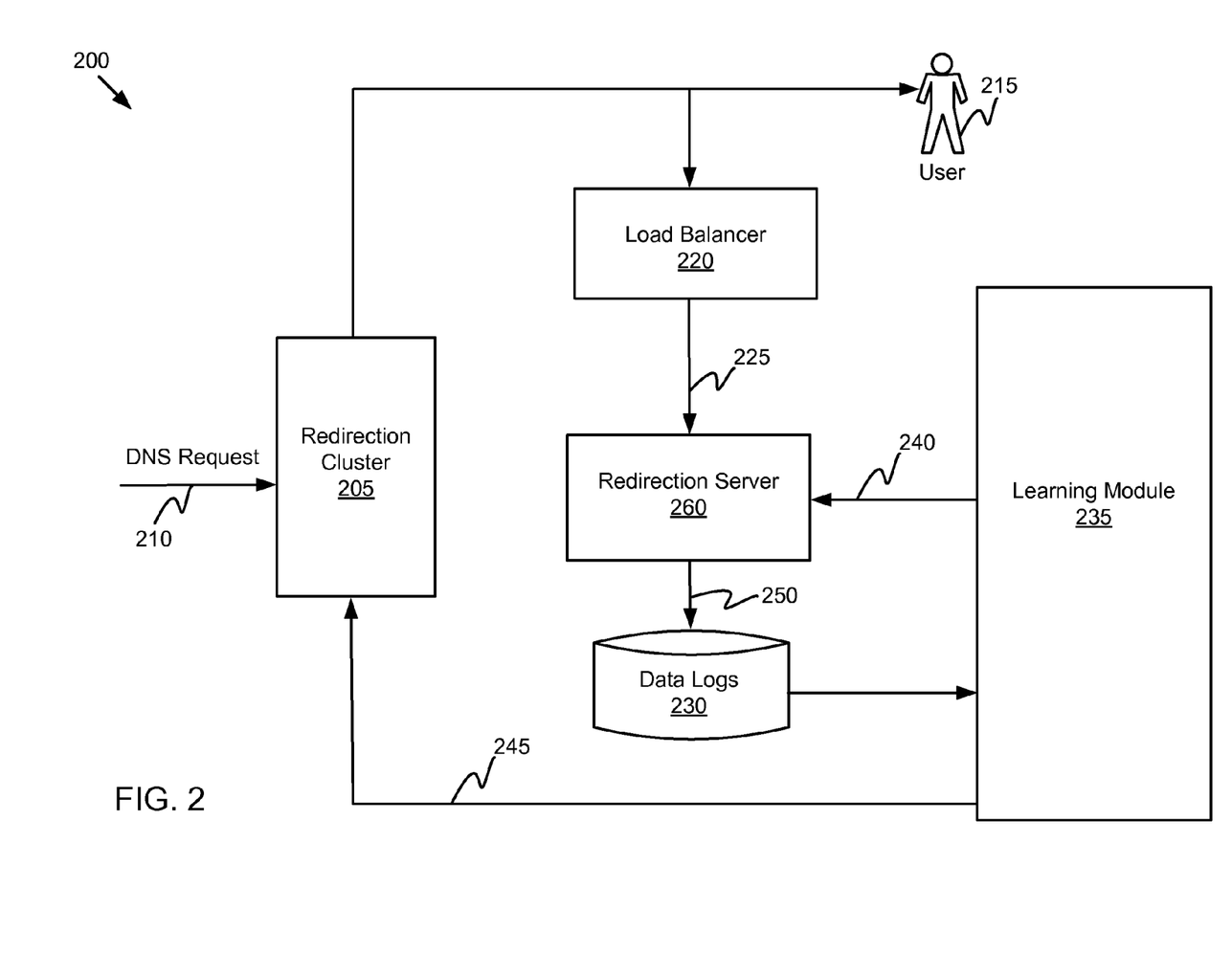
FIG. 2 is a schematic illustrating an exemplary architecture according to the present invention.

FIG. 2 is a schematic illustrating an exemplary architecture 200 according to the present invention. A redirection cluster 205 may include the Intelligent DNS platform 120, the nonexistent domain redirection module 125, the malicious domain redirection module 130, and the user access redirection module 135 of FIG. 1. The redirection cluster 205 receives a DNS request 210 initiated by a user 215. As mentioned above, the load balancer 220 may be communicatively coupled between the user 215 and a redirection server 260. The redirection server 260 may include a navigation assistant module 140 server and a filter. The navigation assistant module 140 server may be the navigation assistant module 140, or may be a subset or superset thereof. The load balancer 220 might only allow a certain protocol (e.g. http) through to the navigation assistant module 140, for instance, as mentioned above.

A query 225 that includes a request to download a view including at least one of the follow-up signals described above (sent to the redirection server 260) may be indicative of the presence of a real user 215 (human as opposed to a bot etc.). As mentioned previously, any suitable means of determining indicators of real users is contemplated.

Data 250 related to both the queries received and resultant responses, for example follow-up signals, may be output to a database of data logs 230. The data logs 230 are communicatively coupled with the learning module 235. The operation of the learning module 235 is described in further detail below.

The redirection server 260 receives an output 240 from the learning module 235. The policies controlling the redirection server 260 use the input from the learning module 235 at data to aid in formulating an appropriate response to each query. A response recommendation 245 is transmitted from the learning module 235 to the redirection cluster 205. The generation of the response recommendation 245 aids the policies within the redirection cluster 205 to efficiently filter out flagged IP addresses, undesirable users, bots, etc.

Figure 3:
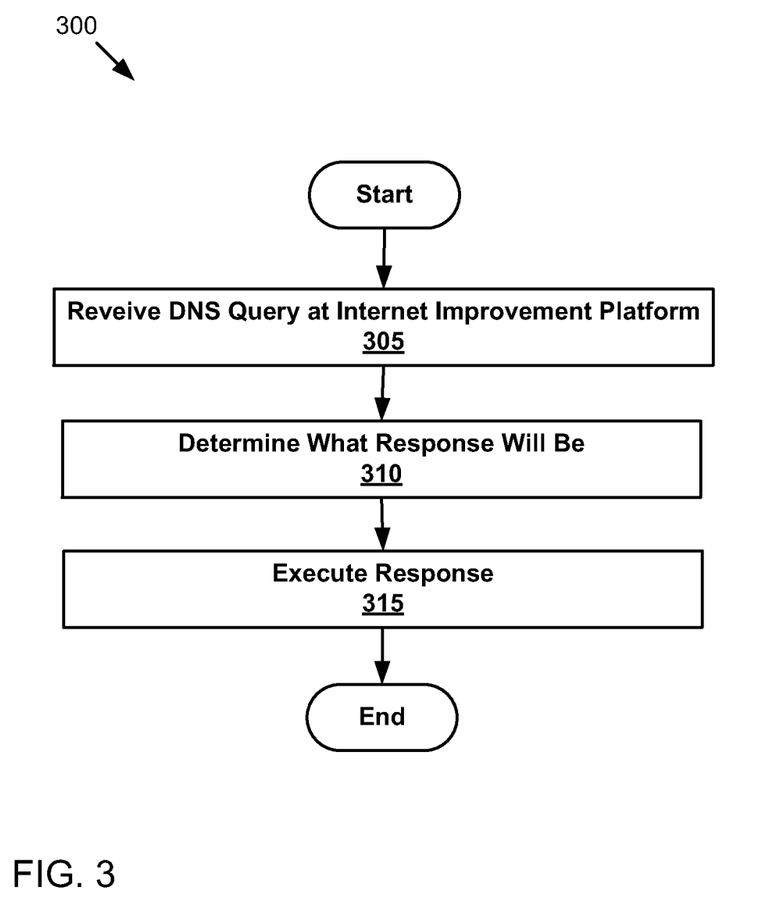
FIG. 3 is a flowchart of an exemplary method for directing DNS server traffic.

FIG. 3 is a flowchart 300 of an exemplary method for directing DNS server traffic. At step 305, a DNS query issued from an Internet application running on a computer device is received at the Internet improvement platform 155 (e.g. at the nonexistent domain redirection module 125). For example, a user may enter a nonexistent domain name into a browser (Internet application) running on the user's computer.

At step 310, it is determined at the Internet improvement platform 155 what an appropriate response to the DNS query will be. It should be noted that not serving the DNS query, i.e. no response, may be an appropriate response. For example, there may be instances in which the Internet improvement platform 155 forwards a request related to the DNS query to the Internet and receives back an NXDOMAIN message indicating that the given domain does not exist. Such an instance may occur when the user types in a domain name that does not exist. The user may misspell or mistype the domain name, or the domain name may no longer exist. In one embodiment, the nonexistent domain redirection module 125 receives the NXDOMAIN via the redirection cluster 205.

The system 200 determines an appropriate response to each DNS query received. The type of response may be established by the operating policies of the system. The operating policies may be changed with each submitted query. The system 200 uses the data collected in the data logs 230 to formulate the appropriate response to a query. The formulated response may vary with time in light of data collected and considered by the system 200. Data considered in formulating the appropriate response includes, but is not limited to, prior Internet Improvement Platform events, stored data relative to query parameters and prior response data, and end user interaction data. Data may be imported from other sources or third parties.

At step 315, the response is executed in response to the DNS query. Executing the response may include redirecting the Internet application (e.g. browser etc.) to an Internet service. For example, the Internet improvement platform 155 may send an IP address to the user's browser. In one embodiment, the search IP address may be sent to the browser via one or more of the nonexistent domain redirection module 125, the intelligent DNS platform 120, and the network 110. The user's computer may then connect to the search page. The Internet improvement platform 155 or the search page may then deliver a results page (e.g. including links to advertisements) to the user's browser. Thus, what would otherwise be "junk traffic" is now capable of generating revenue while maximizing customer satisfaction.

It is envisioned that various embodiments may allow system administrators or others to define multiple policy configurations applicable to one or more end users or websites. Policy configurations may vary based upon designated times, conditional triggers, or specific requests from users with administrative authority.

Figure 4:
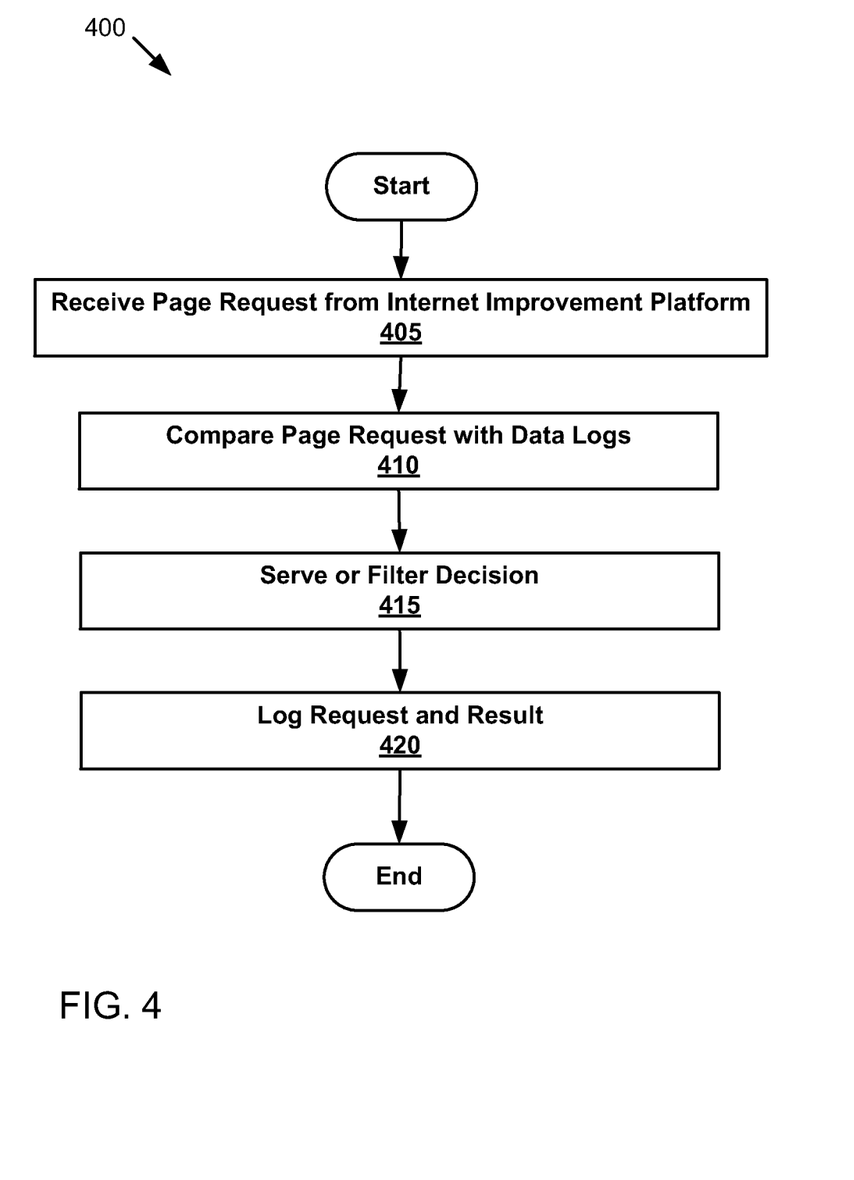
FIG. 4 is a flowchart of an exemplary mode of operation of the Internet improvement platform including the learning module.

The evaluation process associated with the formulated response may be better understood with reference to the flowchart 400 of FIG. 4. When the system 200 receives a DNS request 210 with an erroneous domain name, the redirection cluster 205 may propose a redirection of the DNS request 210 with a substitute page request. The page request (resultant from the DNS request 210) may then be evaluated with input from the learning module 235 and the data logs 230. Depending on the result of the evaluation process, the page request may or may not be returned to the user 215.

The evaluation process begins with a step 405 in which the redirected page request is received from the redirection cluster 205 at the redirection server 260. In a comparing step 410, the page request is compared by the learning module 235 with the data logs 230. The page request is checked against the data logs 230 to determine in a decision step 415 whether or not the request should be served or filtered. There may be multiple categories of criteria for filtering the page request.

One category of filtered requests may include pages that appear on a manual entry log in the data logs 230. It is envisioned that the manual entry log may include those pages deemed to be not worthy of being served to the user 215 by an administrator of the system 200. These pages may be known to be the results of queries initiated by non-real (non-human, such as bots, etc.) users 215, malicious domains, etc.

Another category of page requests that are filtered may include pages determined by a learning process within the system 200, e.g. in the learning module 235. This category is populated by pages determined by the learning module 235 to not be candidates to be served to the user 215. The learning module 235 may check the page request for certain pattern or trends that indicate the source of the request. For example, the same address requested fifty times in one minute is not a typographical error by a human user, but is far more likely to be a bot generated request.

Still another category of page requests that may not be served are those requests that the data logs 230 show to not be associated with any returned follow-up signals in spite of a high number of requests. The number of requests that triggers this filter is variable, and is determined by a system administrator, the learning algorithms or others. An important aspect of this set of filtering criteria in various embodiments is that the number of page requests served is never set to zero. This allows the system 200 to probe the page request from time to time, perhaps with a 0.1% frequency, to determine if any beneficial activity is detected. By filtering only a high percentage of the page requests, for instance 99.9%, the system is able to avoid erroneous filters. The percentage of requests served, although it may be a very low percentage, enables the system 200 to detect a valid request, and to reclassify the request accordingly.

Another category of page requests includes those requests that do not yet have a definitive history, but that have a history of at least some percentage of follow-up signals returns. These requests may be served, and the data from the serves collected to add to the data logs 230.

Another category of page requests are those requests for which the system 200 has no record. If the page request does not appear in the data logs 230, the request may be served, and the results of the serve may be recorded in the data logs 230.

In a recording step 420, the learning module 235 and the data logs 230 record the characteristics of each DNS request 210 received, and the result of any resultant served pages. The characteristics recorded may include the source of the page request, the number of identical requests, and the time frame in which the requests were made. The results that are recorded may include the number of times a follow-up signal is returned. The number of times a follow-up signal is returned is important, because a request 225 to download a view including a follow-up signal (sent to the redirection server 260) may be indicative of the presence of a real user 215 (again, a human as opposed to a bot, etc.).

As mentioned above, a follow-up signal can be any suitable means of determining indicators of real users, and all such determination means are contemplated herein. Data 250 related to, for example, follow-up signal downloads is output to the data logs 230.

In various embodiments of the system 200, the learning module 235 creates and maintains a categorization metric for each page served. The categorization metric may be probabilistic. For example, the requests for a given page may be determined by the categorization metric to be 20% from a real user and 80% from an automated program. The response of the Internet Improvement Platform to the request for the page may be dependent on the categorization metric. The page requests and the follow-up signals are all transmitted through the unreliable internet where packets can be dropped and false signals can be generated by hackers. The probabilistic model in the learning module is a way to counter the unreliability of the input to the Internet improvement platform. The categorization metric may be a composite score created and maintained for each page served. The composite score may be adjusted for each request depending on the follow-up signal for each viewed page.

A system administrator may use the composite score to determine which page requests will be served and which page requests will be filtered. A serve value composite score may be established. A page request with a composite score below the selected value may always be served. Similarly, a filter value composite score may be established. A page request with a composite score greater than the filter value may be served only a very low percentage of the time. As noted above, even page requests with very high composite scores will be served some finite percentage of the time in order to detect possible errors in characterization of the request.

Figure 5:
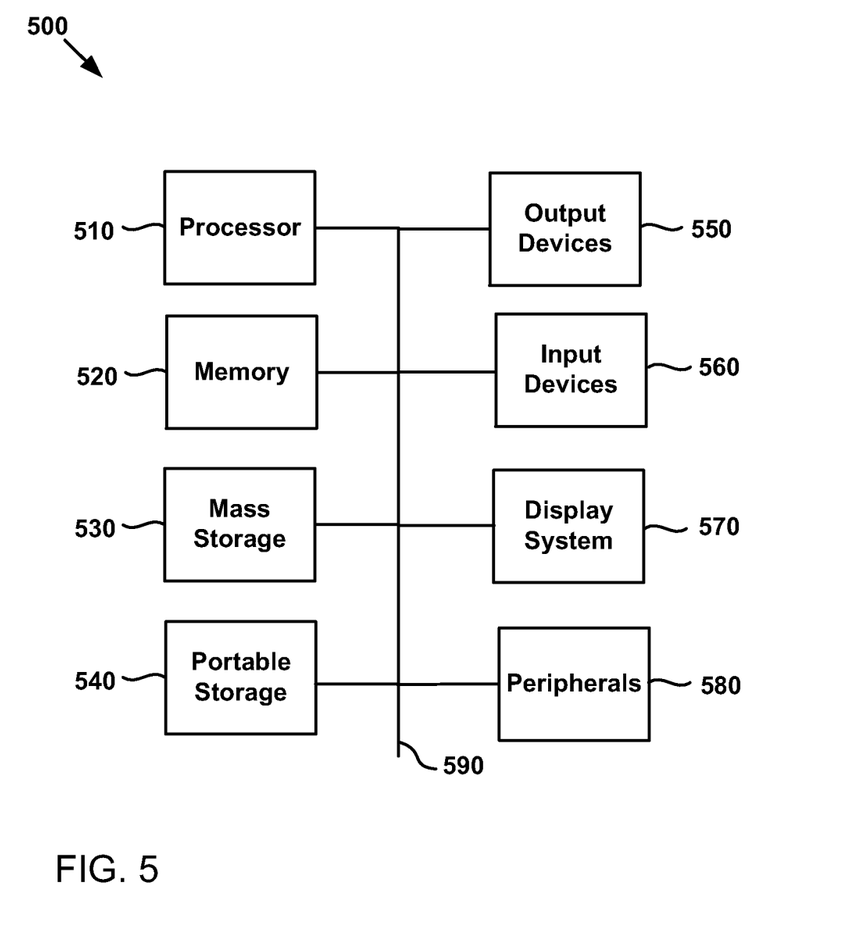
FIG. 5 illustrates an exemplary computing system that may be used to implement embodiments according to the present invention.

FIG. 5 illustrates an exemplary computing system 500 that may be used to implement embodiments according to the present invention. The computing system 500 of FIG. 5 includes one or more processors 510 and memory 520. The main memory 520 stores, in part, instructions and data for execution by the processor 510. The main memory 520 can store the executable code when the system 500 is in operation. The system 500 of FIG. 5 may further include a mass storage device 530, portable storage medium drive(s) 540, output devices 550, user input devices 560, a graphics display 570, and other peripheral devices 580.

The components shown in FIG. 5 are depicted as being connected via a single bus 590. The components may be connected through one or more data transport means. The processor unit 510 and the main memory 520 may be connected via a local microprocessor bus, and the mass storage device 530, peripheral device(s) 580, portable storage device 540, and display system 570 may be connected via one or more input/output (I/O) buses.

The mass storage device 530, which may be implemented with a magnetic disk drive or an optical disk drive, is a non-volatile storage device for storing data and instructions for use by the processor unit 510. The mass storage device 530 can store the system software for implementing embodiments of the present invention for purposes of loading that software into the main memory 520.

The portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

The input devices 560 provide a portion of a user interface. The input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

The display system 570 may include a liquid crystal display (LCD) or other suitable display device. The display system 570 receives textual and graphical information, and processes the information for output to the display device.

The peripherals 580 may include any type of computer support device to add additional functionality to the computer system. The peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, servers, multi-processor platforms, etc. Various operating systems can be used including UNIX, Linux, Windows, Macintosh OS, Palm OS, and other suitable operating systems.

Modules and other blocks or elements disclosed herein can be stored as software, firmware, hardware, as a combination, or in various other ways. It is contemplated that various modules can be removed or included in other suitable locations besides those locations specifically disclosed herein. In various embodiments, additional modules, blocks, or elements can be included in the exemplary system described herein.

The embodiments described herein are illustrative of the present invention. As these embodiments of the present invention are described with reference to illustrations, various modifications or adaptations of the methods and or specific structures described may become apparent to those skilled in the art in light of the descriptions and illustrations herein. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of directing Internet traffic, the method comprising:

receiving, via a module stored in a memory and executed by a processor, at an Internet improvement platform, a DNS query issued from an Internet application running on a computing device;

determining, at a learning module, one or more appropriate response policies to the DNS query, wherein the response policies are variable over time, and wherein the determining includes examining response content data to determine whether the DNS response is associated with malicious or otherwise untrustworthy name servers on the Internet; and executing a response via one or more components of the Internet improvement platform according to the response policies.

2. The method of claim 1, wherein determining includes examining the response content data to determine whether the DNS response includes IP addresses associated with malicious or otherwise untrustworthy Internet destinations.

3. The method of claim 1, wherein determining includes utilizing the learning module to collect and evaluate data to establish response policies based on that data.

4. The method of claim 3, wherein determining further includes inputting malicious or untrustworthy name servers.

5. The method of claim 3, wherein determining further includes inputting IP addresses.

6. The method of claim 1, wherein the data includes any of network events, interactions between query sources and a system, and third party databases.

7. The method of claim 1, wherein determining includes examining request and response content data to determine whether the DNS query warrants redirection.

8. The method of claim 1, wherein determining includes examining request and response content data to determine whether the DNS query is associated with a malicious domain.

9. The method of claim 1, wherein determining includes examining request and response content data to determine whether the DNS query is associated with a nonexistent domain.

10. The method of claim 1, wherein determining includes accessing a database of address content information.

11. The method of claim 1, wherein determining includes determining that an IP address related to the DNS query warrants redirection.

12. The method of claim 1, wherein determining includes determining that an IP address related to the DNS query is the IP address of a malicious domain.

13. The method of claim 1, wherein determining includes determining that an IP address related to the DNS query is the IP address of name servers associated with a nonexistent domain.

14. The method of claim 1, wherein determining includes applying one or more policy modules in the Internet improvement platform.

15. The method of claim 1, wherein executing the response comprises redirecting the Internet application to an Internet service.

16. The method of claim 1, wherein the method further comprises receiving and acting on DNS requests in view of global Internet events and occurrences.

17. A method of directing Internet traffic, the method comprising:
- receiving, via a module stored in a memory and executed by a processor, at an Internet improvement platform, a DNS query issued from an Internet application running on a computing device;
- determining, at a learning module, at least one appropriate response policy to be effected with respect to the DNS query, wherein the response policies are variable over time, and wherein the determining includes considering prior network events, stored data relative to query parameters, prior response data, and interaction data between query sources and a system to establish response policies;
- executing a response via one or more components of the Internet improvement platform according to one or more response policies; and
- recording a data characteristic of the query and the response.

18. The method of claim 17, wherein the stored data includes a record of any network event, interactions between the query sources and the system, and data from third party databases.

19. The method of claim 17, wherein determining includes utilizing the learning module to collect and evaluate data to establish response policies.

20. The method of claim 19, wherein determining further includes inputting malicious or untrustworthy name servers.

21. The method of claim 19, wherein determining further includes inputting IP addresses.

22. The method of claim 17, wherein determining includes examining response content data to determine whether the DNS response is associated with malicious or otherwise untrustworthy name servers on the Internet.

23. The method of claim 17, wherein determining includes examining response content data to determine whether the DNS response includes IP addresses associated with malicious or otherwise untrustworthy Internet destinations.

24. The method of claim 17, wherein determining includes examining request and response content data to determine whether the DNS query warrants redirection.

25. The method of claim 17, wherein determining includes examining request and response content data to determine whether the DNS query is associated with a malicious domain.

26. The method of claim 17, wherein determining includes examining request and response content data to determine whether the DNS query is associated with a nonexistent domain.

27. The method of claim 17, wherein determining includes accessing a database of address content information.

28. The method of claim 17, wherein determining includes determining that an IP address related to the DNS query warrants redirection.

29. The method of claim 17, wherein determining includes determining that an IP address related to the DNS query is the IP address of a malicious domain.

30. The method of claim 17, wherein determining includes determining that an IP address related to the DNS query is the IP address of a nonexistent domain.

31. The method of claim 17, wherein determining includes using data or information stored in one or more policy modules in the Internet improvement platform.

32. The method of claim 17, wherein the method further comprises receiving and acting on DNS requests in view of global Internet events and occurrences.

33. The method of claim 17, wherein recording data characteristic of the query and the response includes recording a number of times an address has been submitted.

34. The method of claim 17, wherein recording data characteristic of the query and the response includes monitoring subsequent interactions to determine whether the DNS query source is a human user or an automated program.

35. The method of claim 17, wherein recording data characteristic of the query and the response includes recording a number of queries from a specified agent.

36. The method of claim 17, wherein the method further comprises testing addresses from which queries have been redirected to collect further data on the validity of the queries.

37. The method of claim 17, wherein the method further comprises inputting user-defined queries that are to be redirected.

38. A system for directing Internet traffic, the system comprising:
- a series of instructions stored in a memory and executed by a processor on a computing device to perform the following steps:
  - receiving, via a module stored in a memory and executed by a processor, at an Internet improvement platform, a DNS query issued from an Internet application running on a computing device;
  - determining, at a learning module, appropriate response policies to the DNS query, wherein the response policies are variable over time; and
  - executing a response via one or more components of the Internet improvement platform according to the response policies.

39. The system of claim 38, wherein determining includes examining response content data to determine whether a DNS response is associated with malicious or otherwise untrustworthy name servers on the Internet.

40. The system of claim 38, wherein determining includes examining response content data to determine whether a DNS response includes IP addresses associated with malicious or otherwise untrustworthy Internet destinations.

41. The system of claim 38, wherein determining includes utilizing the learning module to collect and evaluate data to establish response policies.

42. The system of claim 41, wherein determining further includes inputting malicious or untrustworthy name servers.

43. The system of claim 41, wherein determining further includes inputting IP addresses.

44. The system of claim 41, wherein the data includes any of network events, interactions between query sources and the system, and third party databases.

45. The system of claim 38, wherein determining includes examining request and response content data to determine whether the DNS query warrants redirection.

46. The system of claim 38, wherein determining includes examining request and response content data to determine whether the DNS query is associated with a malicious domain.

47. The system of claim 38, wherein determining includes examining request and response content data to determine whether the DNS query is associated with a nonexistent domain.

48. The system of claim 38, wherein determining includes accessing a database of address content information.

49. The system of claim 38, wherein determining includes determining that an IP address related to the DNS query warrants redirection.

50. The system of claim 38, wherein determining includes determining that an IP address related to the DNS query is the IP address of a malicious domain.

51. The system of claim 38, wherein determining includes determining that an IP address related to the DNS query is the IP address of a nonexistent domain.

52. The system of claim 38, wherein determining includes applying one or more policy modules in the Internet improvement platform.

53. The system of claim 38, wherein executing the response comprises redirecting the Internet application to an Internet service.

54. The system of claim 53, wherein the system further comprises receiving and acting on DNS requests in view of global Internet events and occurrences.

55. A system for directing Internet traffic, the system comprising:
a series of instructions stored in a memory and executed by a processor on a computing device to perform the following steps:
receiving, via a module stored in a memory and executed by a processor, at an Internet improvement platform, a DNS query issued from an Internet application running on a computing device;
determining, at a learning module, appropriate response policies to the DNS query, the determination including a consideration of prior network events, stored data relative to query parameters and prior response data, and interaction data between query sources and the system, and wherein the response policies are variable over time;
executing a response via one or more components of the Internet improvement platform according to the response policies; and
recording data characteristic of the query and the response.

56. The system of claim 55, wherein determining includes examining response content data to determine whether a DNS response is associated with malicious or otherwise untrustworthy name servers on the Internet.

57. The system of claim 55, wherein determining includes examining response content data to determine whether a DNS response includes IP addresses associated with malicious or otherwise untrustworthy Internet destinations.

58. The system of claim 55, wherein determining includes utilizing the learning module to collect and evaluate data to establish response policies based on that data.

59. The system of claim 52, wherein determining further includes inputting malicious or untrustworthy name servers.

60. The system of claim 58, wherein determining further includes inputting IP addresses.

61. The system of claim 58, wherein the data includes any of network events, interactions between the query sources and the system, and third party databases.

62. The system of claim 55, wherein determining includes examining request and response content data to determine whether the DNS query warrants redirection.

63. The system of claim 55, wherein determining includes examining request and response content data to determine whether the DNS query is associated with a malicious domain.

64. The system of claim 55, wherein determining includes examining request and response content data to determine whether the DNS query is associated with a nonexistent domain.

65. The system of claim 55, wherein determining includes accessing a database of address content information.

66. The system of claim 55, wherein determining includes determining that an IP address related to the DNS query warrants redirection.

67. The system of claim 55, wherein determining includes determining that an IP address related to the DNS query is the IP address of a malicious domain.

68. The system of claim 55, wherein determining includes determining that an IP address related to the DNS query is the IP address of a nonexistent domain.

69. The system of claim 55, wherein determining includes applying one or more policy modules in the Internet improvement platform.

70. The system of claim 55, wherein the system further comprises receiving and acting on DNS requests in view of global Internet events and occurrences.

71. The system of claim 55, wherein recording data characteristic of the query includes recording a number of times an address has been submitted.

72. The system of claim 55, wherein recording data characteristic of the query includes monitoring subsequent interactions to determine whether the DNS query source is a human user or an automated program.

73. The system of claim 55, wherein recording data characteristic of the query includes recording a number of queries from a specified agent.

74. The system of claim 55, wherein the system further comprises testing addresses from which queries have been redirected to collect further data on the validity of the queries.

75. The system of claim 55, wherein the system further comprises inputting a list of user-defined queries that are to be redirected.

76. A non-transitory computer-readable storage medium having embodied thereon a program, the program executable by a processor to perform a method of directing DNS traffic, the program comprising the following steps:
receiving, at an Internet improvement platform, a DNS query issued from an Internet application running on a computing device;
determining, at a learning module, appropriate response policies to the DNS query, wherein the response policies are variable over time, and wherein the determining includes examining response content data to determine whether a DNS response is associated with malicious or otherwise untrustworthy name servers on the Internet; and
executing a response via one or more components of the Internet improvement platform according to the response policies.

77. The computer-readable storage medium of claim 76, wherein determining an appropriate response further includes considering query and response data.

78. The computer-readable storage medium of claim 77, wherein determining further includes inputting the malicious or otherwise untrustworthy name servers.

79. The computer-readable storage medium of claim 77, wherein determining further includes inputting IP addresses.

80. The computer-readable storage medium of claim 76, wherein the program further comprises recording data characteristic of the query and the response.

81. A method of directing Internet traffic, the method comprising:
receiving, via a module stored in a memory and executed by a processor, at an Internet improvement platform, a DNS query issued from an Internet application running on a computing device;
determining, at a learning module, one or more appropriate response policies to the DNS query, wherein the response policies are periodically retested, and wherein the determining includes examining response content data to determine whether a DNS response is associated with malicious or otherwise untrustworthy name servers on the Internet; and executing a response via one or more components of the Internet improvement platform according to the response policies.

82. The method of claim 81, wherein determining includes utilizing the learning module to collect and evaluate data to establish response policies based on that data.

83. The method of claim 82, wherein determining further includes inputting malicious or untrustworthy name servers.

84. The method of claim 81, wherein the data includes any of network events, interactions between query sources and a system, and third party databases.

85. The method of claim 81, wherein determining includes examining a request and the response content data to determine whether the DNS query warrants redirection.

86. The method of claim 81, wherein determining includes examining a request and the response content data to determine whether the DNS query is associated with a nonexistent domain.

87. The method of claim 81, wherein determining includes determining that an IP address related to the DNS query warrants redirection.

88. The method of claim 81, wherein determining includes determining that an IP address related to the DNS query is the IP address of name servers associated with a nonexistent domain.

89. The method of claim 81, wherein determining includes applying one or more policy modules in the Internet improvement platform.

90. The method of claim 81, wherein executing the response comprises redirecting the Internet application to an Internet service.

91. A method of directing Internet traffic, the method comprising:

receiving, via a module stored in a memory and executed by a processor, at an Internet improvement platform, a DNS query issued from an Internet application running on a computing device;

determining, at a learning module, one or more appropriate response policies to the DNS query;

executing a response via one or more components of the Internet improvement platform according to the response policies, wherein executing the response comprises redirecting the Internet application to an Internet service; and receiving compensation due to redirecting the Internet application to the Internet service.

92. The method of claim 91, wherein determining includes utilizing the learning module to collect and evaluate data to establish response policies based on that data.

93. The method of claim 91, wherein the data includes any of network events, interactions between query sources and a system, and third party databases.

94. The method of claim 91, wherein determining includes examining request and response content data to determine whether the DNS query warrants redirection.

95. The method of claim 91, wherein determining includes examining request and response content data to determine whether the DNS query is associated with a nonexistent domain.

96. The method of claim 91, wherein determining includes determining that an IP address related to the DNS query is the IP address of name servers associated with a nonexistent domain.

97. The method of claim 91, wherein determining includes applying one or more policy modules in the Internet improvement platform.

98. The method of claim 91, wherein executing the response comprises redirecting the Internet application to an Internet service.

99. A method of directing Internet traffic, the method comprising:

receiving, via a module stored in a memory and executed by a processor, at an Internet improvement platform, a DNS query issued from an Internet application running on a computing device;

determining, at a learning module, at least one appropriate response policy to be effected with respect to the DNS query, wherein the response policies are periodically retested, and wherein the determining includes considering prior network events, stored data relative to the query parameters, prior response data, and interaction data between query sources and a system to establish response policies;

executing a response via one or more components of the Internet improvement platform according to one or more response policies,; and recording a data characteristic of the query and the response.

100. The method of claim 99, wherein the stored data includes a record of any network event, interactions between the query sources and the system, and data from third party databases.

101. The method of claim 99, wherein determining includes utilizing the learning module to collect and evaluate data to establish the response policies.

102. The method of claim 99, wherein determining includes examining request and response content data to determine whether the DNS query warrants redirection.

103. The method of claim 99, wherein determining includes examining request and response content data to determine whether the DNS query is associated with a nonexistent domain.

104. The method of claim 99, wherein determining includes using data or information stored in one or more policy modules in the Internet improvement platform.

105. The method of claim 99, wherein recording data characteristic of the query and the response includes recording a number of times an address has been submitted.

106. The method of claim 99, wherein recording data characteristic of the query and the response includes monitoring subsequent interactions to determine whether the DNS query source is a human user or an automated program.

107. The method of claim 99, wherein recording data characteristic of the query and the response includes recording a number of queries from a specified agent.

108. The method of claim 99, wherein the method further comprises testing addresses from which queries have been redirected to collect further data on the validity of the queries.

109. The method of claim 99, wherein the method further comprises inputting user-defined queries that are to be redirected.

110. A method of directing Internet traffic, the method comprising:
- receiving, via a module stored in a memory and executed by a processor, at an Internet improvement platform, a DNS query issued from an Internet application running on a computing device;
- determining, at a learning module, at least one appropriate response policy to be effected with respect to the DNS query;
- executing a response via one or more components of the Internet improvement platform according to one or more response policies, wherein executing the response includes any of responding with an IP address to a search results page to assist a user with reaching their intended destination, responding with an IP address to a teaching page to alert the user to malicious content on the requested page, responding with altered search results that better capture the user's intent or interests, dynamically adding a malicious domain or malicious IP to the data stored in the Internet improvement platform, and redirecting the Internet application to an alternative Internet service;
- recording a data characteristic of the query and the response; and
- receiving compensation due to redirecting the Internet application to the Internet service.

111. The method of claim 110, wherein the stored data includes a record of any network event, interactions between query sources and a system, and data from third party databases.

112. The method of claim 110, wherein determining includes utilizing the learning module to collect and evaluate data to establish response policies.

113. The method of claim 110, wherein determining includes examining request and response content data to determine whether the DNS query is associated with a non-existent domain.

114. The method of claim 110, wherein determining includes determining that an IP address related to the DNS query warrants redirection.

115. The method of claim 110, wherein determining includes using data or information stored in one or more policy modules in the Internet improvement platform.

116. The method of claim 110, wherein recording data characteristic of the query and the response includes recording a number of times an address has been submitted.

117. The method of claim 110, wherein recording data characteristic of the query and the response includes monitoring subsequent interactions to determine whether the DNS query source is a human user or an automated program.

118. The method of claim 110, wherein recording data characteristic of the query and the response includes recording a number of queries from a specified agent.

119. The method of claim 110, wherein the method further comprises testing addresses from which queries have been redirected to collect further data on the validity of the queries.

120. The method of claim 110, wherein the method further comprises inputting user-defined queries that are to be redirected.

121. A system for directing Internet traffic, the system comprising:
- a series of instructions stored in a memory and executed by a processor on a computing device to perform the following steps:
    - receiving, via a module stored in a memory and executed by a processor, at an Internet improvement platform, a DNS query issued from an Internet application running on a computing device;
    - determining, at a learning module, appropriate response policies to the DNS query, wherein the response policies are periodically retested; and
    - executing a response via one or more components of the Internet improvement platform according to the response policies.

122. The system of claim 121, wherein determining includes utilizing the learning module to collect and evaluate data to establish the response policies.

123. The system of claim 121, wherein data includes any of network events, interactions between query sources and the system, and third party databases.

124. The system of claim 121, wherein determining includes examining request and response content data to determine whether the DNS query warrants redirection.

125. The system of claim 121, wherein determining includes examining request and response content data to determine whether the DNS query is associated with a non-existent domain.

126. The system of claim 121, wherein determining includes applying one or more policy modules in the Internet improvement platform.

127. The system of claim 121, wherein executing the response comprises redirecting the Internet application to an Internet service.

128. The system of claim 121, wherein the system further comprises receiving and acting on DNS requests in view of global Internet events and occurrences.

129. A system for directing Internet traffic, the system comprising:
- a series of instructions stored in a memory and executed by a processor on a computing device to perform the following steps:
    - receiving, via a module stored in a memory and executed by a processor, at an Internet improvement platform, a DNS query issued from an Internet application running on a computing device;
    - determining, at a learning module, appropriate response policies to the DNS query;
    - executing a response via one or more components of the Internet improvement platform according to the response policies, wherein executing the response comprises redirecting the Internet application to an Internet service; and
    - receiving compensation due to redirecting the Internet application to the Internet service.

130. The system of claim 129, wherein determining includes examining response content data to determine whether the DNS response includes IP addresses associated with malicious or otherwise untrustworthy Internet destinations.

131. The system of claim 129, wherein determining includes utilizing the learning module to collect and evaluate data to establish response policies.

132. The system of claim 131, wherein determining further includes inputting malicious or untrustworthy name servers.

133. The system of claim 131, wherein determining further includes inputting IP addresses.

134. The system of claim 129, wherein determining includes examining request and response content data to determine whether the DNS query warrants redirection.

135. The system of claim 129, wherein determining includes examining request and response content data to determine whether the DNS query is associated with a non-existent domain.

136. The system of claim 129, wherein determining includes determining that an IP address related to the DNS query is the IP address of a malicious domain.

137. The system of claim 129, wherein determining includes determining that an IP address related to the DNS query is the IP address of a nonexistent domain.

138. The system of claim 129, wherein determining includes applying one or more policy modules in the Internet improvement platform.

139. The system of claim 129, wherein the system further comprises receiving and acting on DNS requests in view of global Internet events and occurrences.

140. A system for directing Internet traffic, the system comprising:
a series of instructions stored in a memory and executed by a processor on a computing device to perform the following steps:
receiving, via a module stored in a memory and executed by a processor, at an Internet improvement platform, a DNS query issued from an Internet application running on a computing device;
determining, at a learning module, appropriate response policies to the DNS query, the determination including a consideration of prior network events, stored data relative to query parameters and prior response data, and interaction data between query sources and the system, and wherein the response policies are periodically retested;
executing a response via one or more components of the Internet improvement platform according to the response policies; and
recording data characteristic of the query and the response.

141. The system of claim 140, wherein determining includes examining response content data to determine whether the DNS response includes IP addresses associated with malicious or otherwise untrustworthy Internet destinations.

142. The system of claim 140, wherein determining includes utilizing the learning module to collect and evaluate data to establish response policies based on that data.

143. The system of claim 142, wherein determining further includes inputting malicious or untrustworthy name servers.

144. The system of claim 142, wherein determining further includes inputting IP addresses.

145. The system of claim 140, wherein determining includes examining request and response content data to determine whether the DNS query warrants redirection.

146. The system of claim 140, wherein determining includes examining request and response content data to determine whether the DNS query is associated with a nonexistent domain.

147. The system of claim 140, wherein recording data characteristic of the query includes recording a number of times an address has been submitted.

148. The system of claim 140, wherein recording data characteristic of the query includes monitoring subsequent interactions to determine whether the DNS query source is a human user or an automated program.

149. The system of claim 140, wherein recording data characteristic of the query includes recording a number of queries from a specified agent.

150. The system of claim 140, wherein the system further comprises testing addresses from which queries have been redirected to collect further data on the validity of the queries.

151. The system of claim 150, wherein the system further comprises inputting a list of user-defined queries that are to be redirected.

152. A system for directing Internet traffic, the system comprising:
a series of instructions stored in a memory and executed by a processor on a computing device to perform the following steps:
receiving, via a module stored in a memory and executed by a processor, at an Internet improvement platform, a DNS query issued from an Internet application running on a computing device;
determining, at a learning module, appropriate response policies to the DNS query, the determination including a consideration of prior network events, stored data relative to query parameters and prior response data, and interaction data between query sources and the system;
executing a response via one or more components of the Internet improvement platform according to the response policies, wherein executing the response comprises redirecting the Internet application to an Internet service;
recording data characteristic of the query and the response; and
receiving compensation due to redirecting the Internet application to the Internet service.

153. The system of claim 152, wherein determining includes utilizing the learning module to collect and evaluate data to establish response policies based on that data.

154. The system of claim 153, wherein determining further includes inputting malicious or untrustworthy name servers.

155. The system of claim 153, wherein determining further includes inputting IP addresses.

156. The system of claim 152, wherein determining includes examining request and response content data to determine whether the DNS query warrants redirection.

157. The system of claim 152, wherein determining includes examining request and response content data to determine whether the DNS query is associated with a nonexistent domain.

158. The system of claim 152, wherein recording data characteristic of the query includes recording a number of times an address has been submitted.

159. The system of claim 152, wherein recording data characteristic of the query includes monitoring subsequent interactions to determine whether the DNS query source is a human user or an automated program.

160. The system of claim 152, wherein recording data characteristic of the query includes recording a number of queries from a specified agent.

161. The system of claim 152, wherein the system further comprises testing addresses from which queries have been redirected to collect further data on the validity of the queries.

162. The system of claim 152, wherein the system further comprises inputting a list of user-defined queries that are to be redirected.

163. A system for directing Internet traffic, the system comprising:
a series of instructions stored in a memory and executed by a processor on a computing device to perform the following steps:
receiving, via a module stored in a memory and executed by a processor, at an Internet improvement platform, a DNS query issued from an Internet application running on a computing device;

determining, at a learning module, appropriate response policies to the DNS query, the determination including a consideration of prior network events, stored data relative to query parameters and prior response data, and interaction data between query sources and the system;

executing a response via one or more components of the Internet improvement platform according to the response policies;

recording data characteristic of the query and the response; and modifying a decision to redirect a user based on recorded data relating to the received query.

164. The system of claim 163, wherein determining includes examining response content data to determine whether the DNS response is associated with malicious or otherwise untrustworthy name servers on the Internet.

165. The system of claim 163, wherein determining includes utilizing the learning module to collect and evaluate data to establish response policies based on that data.

166. The system of claim 165, wherein determining further includes inputting malicious or untrustworthy name servers.

167. The system of claim 165, wherein determining further includes inputting IP addresses.

168. The system of claim 163, wherein determining includes examining request and response content data to determine whether the DNS query warrants redirection.

169. The system of claim 163, wherein determining includes examining request and response content data to determine whether the DNS query is associated with a malicious domain.

170. The system of claim 163, wherein determining includes examining request and response content data to determine whether the DNS query is associated with a non-existent domain.

171. The system of claim 163, wherein recording data characteristic of the query includes recording a number of times an address has been submitted.

172. The system of claim 163, wherein recording data characteristic of the query includes monitoring subsequent interactions to determine whether the DNS query source is a human user or an automated program.

173. The system of claim 163, wherein recording data characteristic of the query includes recording a number of queries from a specified agent.

174. The system of claim 173, wherein the system further comprises testing addresses from which queries have been redirected to collect further data on the validity of the queries.

175. The system of claim 173, wherein the system further comprises inputting a list of user-defined queries that are to be redirected.

* * * * *